W. H. SANDFORD.
FRICTION CLUTCH.
APPLICATION FILED APR. 22, 1915.

1,167,117.

Patented Jan. 4, 1916.

Witnesses
Isabel Morris
Fannie Becker

Inventor
William Herbert Sandford
By Knight Bros.
attorney

UNITED STATES PATENT OFFICE.

WILLIAM H. SANDFORD, OF ARMAGH, IRELAND.

FRICTION-CLUTCH.

1,167,117. Specification of Letters Patent. Patented Jan. 4, 1916.

Application filed April 22, 1915. Serial No. 23,071.

*To all whom it may concern:*

Be it known that I, WILLIAM HERBERT SANDFORD, a subject of the King of Great Britain, residing in Armagh, Ireland, have invented certain new and useful Improvements in Friction-Clutches, of which the following is a specification.

The present invention relates to a friction clutch. According to the present invention the friction surfaces are brought into or out of contact by the displacement of the point of application of a pressure exerting means along a pivoted member connected to one of the friction parts. A force acts against a lever so arranged that in displacing the point of application of the said force along the levers with reference to its fulcrum no substantial work is done, thus reducing the effort necessary to actuate the clutch, or the like to a minimum.

The invention is illustrated by way of example only as applied to a form of friction clutch.

Figure 1:
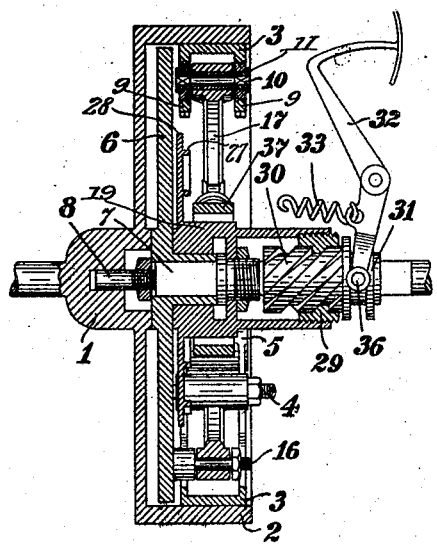
Figure 2:
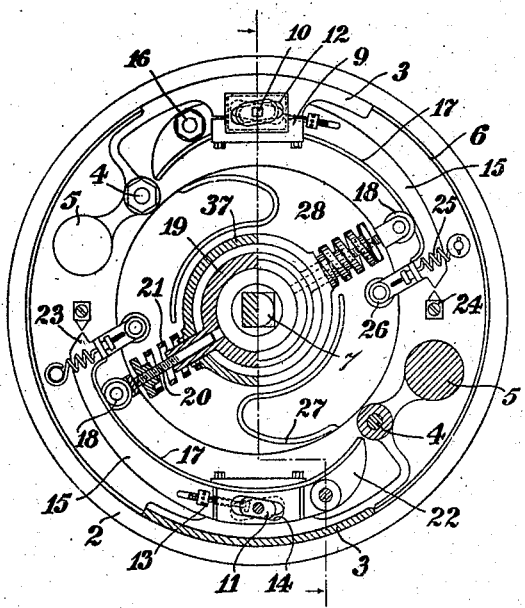
Figure 3:
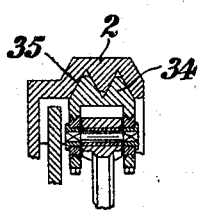

In the drawings:—Figure 1 is a sectional elevation of one form of construction. Fig. 2 is a front elevation of the same, partly in section. Fig. 3 is a detail view of a modification.

The shaft 1 which may for example be the driving shaft, carries a friction drum 2 on the inside of which friction shoes 3 are adapted to bear. The friction shoes 3 are carried upon pivots 4 and provided with counterweights 5 so that the mechanism is properly poised and when they are revolving about the center the shoes will not fly outward under the action of centrifugal force or be influenced by gravity. The pivots 4 of the shoes 3 are carried upon a spider plate or disk 6 carried by the driven shaft 7 which preferably has a bearing 8 in the driving shaft 1, as shown. The shoes carry side brackets 9. In these brackets 9 slotted guides 12 are provided forming slide surfaces for pins 10 which are further provided with sleeves 11 having a nut and screw adjustment 13. These sleeves 11 engage in the slotted portions 14 in lever arms 15 pivoted at 16 to the plate 6. The slotted portions 14 are differentially inclined with reference to the slotted portions 12 so that by an adjustment of the screw and nut connection 13 the pins 10 may be displaced radially so as to adjust the position of the levers 15 when the shoes 3 are in contact with their bearing surface 2. The levers 15 are provided with operating surfaces such as 17 substantially concentric when adjusted with the center of rotation of the carrier hereinafter described. Operating members having rollers 18 at their ends are adapted to engage said surfaces 17 and are carried by a sleeve 19. Rollers 18 are carried upon spindles 20 suitably mounted in the sleeve 19 and springs 21 are arranged between a floating ring 37 and collars on the spindles 20 which latter are preferably screwed thereon so that the tension of the springs 21 and consequently the pressure of the rollers 18 on the friction surfaces 17 of the levers 15 may be adjusted. It will be seen, therefore, that when the pressure rollers 18 lie in radial line with the pivot 16 of the operating levers 15, there will be no pressure upon the shoes 3 either tending to draw these latter into or out of engagement with the friction surface 2. If the pressure rollers pass the pivot 16 and come upon the extended portions 22 of the levers 15, then the shoes 3 will be drawn away from the friction surfaces 2. Of course it will be seen that the greater the distance on the other side of the pivot 16 toward the ends 23 of these operating levers 15 the greater will be the effective pressure of the shoes 3 on the surface 2. A very efficient variable friction clutch is thereby obtained whereby the degree of engagement between the clutching surfaces can be varied from the zero to the maximum, while the operating pressure remains the same and there is no substantial lineal displacement of the pressure and consequently small effort is required to actuate the clutch.

The ends 23 of the levers 15 are preferably mounted as shown and pointers 24 are preferably adjustably mounted on the plate 6 to facilitate the adjustment of the levers 15. The light springs 25 connected adjustably with the levers 15 and the disk 6 assist to just bring the friction surfaces into contact when the pressure rollers 18 lie nearly in radial line with the pivots 16 of said operating levers 15 and consequently have small turning moment upon the said levers. These ends of the levers 15 also carry rollers 26 which are adapted to coöperate with cam surfaces 27 on the plate 28 connected with the sleeve 19. Consequently it will be seen that by turning around the sleeve 19 with the plate 28 from the position shown in Fig. 2 the pressure between the friction shoes 3 and the surface 2 will gradually be released as the rollers 18 move toward the pivot 16 of the operating levers 15. On further movement of the plate 28 the cams 27 will come into the path of the rollers 26 and consequently turn these levers 15 about the pivots 16 as the radial distance of these rollers 26 from the center will be decreased thereby bringing the shoes 3 completely out of engagement with the friction surface 2.

The portions 22 on the end of the levers 15 are preferably arranged of such curvature that the pressure of the springs 21 on the spindles 20 carrying the roller 18 remains constant when the rollers 18 pass on to such portions when the clutch surfaces are out of engagement.

Any desired means may be arranged for the turning of the sleeve 19 and therewith the disk 28 and preferably the sleeve 19 carries an internal threaded nut 29 engaging with a worm 30 which can be displaced axially on the driven shaft 7 by the engagement of the roller 36 with the sleeve 31, which roller 36 is mounted on the end of a lever 32 which may be a hand or a foot lever, as desired, and which turns about a suitable pivot. A spring 33 is adapted to pull on the lever 32 such that the worm 30 is moved axially to keep the rollers 18 at the farthest distance possible from the pivot 16, thereby arranging that the friction surfaces are held normally in engagement at maximum pressure.

It will be noticed that the spring 33 merely requires to be of such tension that it will overcome the friction between the nut 29 and worm 30 and the slight friction in moving the rollers 18 along the cam paths 17 of the operating levers 15. In the same way to disengage the clutch pressure on the foot pedal or hand lever connected to the lever 32 will only require to be such as to overcome the slight pressure of the spring 33.

In the modified form as shown in Fig. 3 multiple engaging surfaces 34 are shown on the friction shoes engaging with corresponding surfaces 35 on the inner side of the friction drum 2. The friction surface on the brake shoes and brake surface of the drum may be increased as found suitable.

I declare that what I claim is:—

1. A rotary friction clutch comprising inner and outer relatively movable frictional parts, a pivotally mounted operating lever actuating said inner frictional part, a spider carrying said inner frictional part, a counterweight on said spider connected to said inner frictional part to avoid the effect of centrifugal force, pressure means for exerting force on said operating lever, and means to change the moment of said force about the fulcrum of said lever.

2. A rotary friction clutch comprising, in combination, a frictional drum, a spider mounted to rotate relatively to said drum, counterweighted frictional shoes mounted upon said spider in operative relation to said drum, pivotally mounted levers mounted upon said spider and operatively connected with said frictional shoes, pressure means for exerting force upon said levers, and means for changing the moments of said force about the fulcra of said levers.

3. A friction clutch comprising in combination, a friction drum, a spider, friction shoes pivoted on said spider in operative relation to said drum, counterweights on said shoes, pivoted levers operatively connected with said shoes, pressure exerting means operating on said levers, and means for changing the point of application of said pressure exerting means upon said levers, relatively to the lever fulcrums.

4. A friction clutch, comprising in combination a friction drum, a spider, friction shoes pivoted on said spider, in operative relation to said drum, counterweights on said shoes, levers connected with said shoes, pivots carrying said levers, cam surfaces on said levers, pressure exerting means operating on said cam surfaces, and means to displace said pressure exerting means along said cam surface.

5. A friction clutch comprising a friction drum, friction shoes, pivots carrying said shoes, counterweights on said shoes preventing displacement of said shoes about said pivots due to centrifugal force, means for exerting pressure on said shoes and means for displacing the point of application on said pressure exerting means relatively to the pivots of said shoes.

6. A friction clutch comprising a friction drum, friction shoes, levers connected to said shoes, pivots carrying said shoes, counterweights on said shoes, pivots carrying said levers, means for exerting pressure on said levers, and means for displacing the point of application of said pressure exerting means relatively to the pivots of said levers.

7. A friction clutch comprising a friction drum, friction shoes, pivots carrying said shoes, adjustable means for exerting pressure on said shoes, and means for displacing the point of application of said pressure exerting means relatively to the pivots of said shoes.

8. A friction clutch comprising a friction drum, friction shoes, levers linked to said shoes, pivots carrying said levers, adjustable means for exerting pressure on said levers and means for displacing the point of application of said pressure exerting means relatively to the pivots of said levers.

9. A friction clutch comprising a friction drum, friction shoes, levers linked to said shoes, pivots carrying said levers, means for exerting pressure on said levers, means for displacing the point of application of said pressure exerting means relatively to the pivots of said levers, and positive means for disengaging said shoes from said friction drum.

10. A friction clutch comprising a friction drum, friction shoes, levers connected to said shoes, pivots carrying said shoes, counter-weights on said shoes, pivots carrying levers, means for exerting pressure on said levers, means for displacing the point of application of said pressure exerting means relatively to the pivots of said levers, and positive means for disengaging said shoes from said friction drum.

11. A friction clutch comprising a friction drum, friction shoes, pivots carrying said shoes, levers connected to said shoes, pivots carrying said levers, pressure plungers engaging said levers, a sleeve carrying said pressure plungers, and means for displacing said sleeve so that the point of application of said pressure plungers on said levers is altered, relatively to the pivots carrying said levers.

12. A friction clutch comprising a friction drum, friction shoes, pivots carrying said shoes, levers connected to said shoes, pivots carrying said levers, spring plungers engaging said levers, a sleeve carrying said spring plungers, and means for displacing said sleeve so that the point of application of said spring plungers on said levers is altered relatively to the pivots carrying said levers.

13. A friction clutch comprising a friction drum, friction shoes, pivots carrying said shoes, levers connected to said shoes, pivots carrying said levers, spring plungers engaging said levers, a ring carrying said spring plungers, and means for turning said ring about its center so that the point of application of said spring plungers on said levers is altered, relatively to the pivots carrying said levers.

14. A friction clutch comprising a friction drum, friction shoes, pivots carrying said shoes, levers connected to said shoes, pivots carrying said levers, pressure plungers engaging said levers, a sleeve carrying said pressure plungers, means for adjusting the thrust of said pressure plungers and means for displacing said sleeve so that the point of application of said plungers on said levers is shifted relatively to the pivots carrying said levers.

In witness whereof, I have hereunto signed my name this 3rd day of April, 1915, in the presence of two subscribing witnesses.

WILLIAM H. SANDFORD.

Witnesses:
  REGINALD W. KIDDLE,
  HENRY W. ASCOTT.

Copies of this patent may be obtained for five cents each, by addressing the "Commissioner of Patents, Washington, D. C."